(12) United States Patent
Niemerg

(10) Patent No.: US 9,856,969 B1
(45) Date of Patent: Jan. 2, 2018

(54) SHAFT SUPPORT FOR A DRIVE DEVICE

(71) Applicant: Hydro-Gear Limited Partnership, Sullivan, IL (US)

(72) Inventor: Joseph P. Niemerg, Dieterich, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 436 days.

(21) Appl. No.: 14/690,665

(22) Filed: Apr. 20, 2015

Related U.S. Application Data

(60) Provisional application No. 61/983,340, filed on Apr. 23, 2014.

(51) Int. Cl.
| | | |
|---|---|---|
| *F16H 57/03* | (2012.01) | |
| *F16H 47/02* | (2006.01) | |
| *F16H 57/021* | (2012.01) | |
| *B60K 17/10* | (2006.01) | |
| *B62D 11/08* | (2006.01) | |

(52) U.S. Cl.
CPC ........... *F16H 57/03* (2013.01); *B60K 17/105* (2013.01); *B62D 11/08* (2013.01); *F16H 47/02* (2013.01); *F16H 57/021* (2013.01)

(58) Field of Classification Search
CPC ........ F16H 57/03; F16H 47/02; F16H 57/021; B60K 17/105
See application file for complete search history.

(56) References Cited

U.S. PATENT DOCUMENTS

| | | | |
|---|---|---|---|
| 3,486,335 A | 12/1969 | Kern et al. | |
| 4,134,175 A | 1/1979 | Contoyanis | |
| 6,481,203 B1* | 11/2002 | Johnson | F04B 1/324 60/487 |
| 6,775,976 B1* | 8/2004 | Phanco | B60K 17/105 60/484 |
| 6,779,615 B2 | 8/2004 | Boyer et al. | |
| 7,073,330 B1 | 7/2006 | Hauser | |
| RE39,255 E * | 9/2006 | Ishii | F16D 39/00 60/487 |
| 7,225,704 B2* | 6/2007 | Ishii | B60K 17/105 180/344 |
| 7,330,680 B2 | 2/2008 | Bryant et al. | |
| 7,537,078 B1* | 5/2009 | Johnwon | B60K 17/10 180/305 |
| 8,464,610 B1* | 6/2013 | Langenfeld | F16H 39/06 74/606 R |
| 8,739,905 B1* | 6/2014 | Bennett | B60K 17/28 180/364 |
| 8,844,658 B2 | 9/2014 | Wyatt et al. | |
| 9,726,269 B1* | 8/2017 | Bennett | F16H 47/02 |
| 2002/0002825 A1* | 1/2002 | Takada | B60K 17/105 60/444 |
| 2005/0070391 A1 | 3/2005 | Folsom et al. | |

(Continued)

*Primary Examiner* — David M Fenstermacher
(74) *Attorney, Agent, or Firm* — Neal, Gerber & Eisenberg LLP

(57) ABSTRACT

A drive device having a shaft support structure located within its housing, such as an axle support structure for providing additional support to a pair of output axles under load. The axle support structure comprises at least one aperture sized to receive a bushing that may have a non-rotation feature. The housing may also include a shaft support structure for other shafts, such as a jackshaft of a gear reduction system disposed between a transmission and the driven output axles.

27 Claims, 16 Drawing Sheets

(56) References Cited

U.S. PATENT DOCUMENTS

2008/0041048 A1* 2/2008 Kanenobu ............ B60K 17/105
                                                                              60/484
2012/0297757 A1* 11/2012 Kamikawa ........... B60K 17/105
                                                                              60/325

* cited by examiner

SHAFT SUPPORT FOR A DRIVE DEVICE

CROSS-REFERENCE TO RELATED APPLICATION

This application claims the benefit of Provisional Application Ser. No. 61/983,340, filed Apr. 23, 2014, the disclosure of which is incorporated herein by reference.

BACKGROUND OF THE INVENTION

This application is related to drive devices for a variety of vehicles, including walk-behind vehicles such as snow throwers, including support structure for axles and other shafts. Depending on the vehicle application, axle loading in these drive devices can be severe. There exists opportunities for improvement to the housings of drive devices to accommodate such axle loading and to provide support for other shafts.

SUMMARY OF THE INVENTION

The present invention provides an improved shaft support in a housing for a drive device, which may be used in a variety of vehicle or other applications to support axles and other shafts such as a jackshaft. The term jackshaft is used herein to generically refer to an intermediate support shaft, such as a shaft to support gears in a gear reduction system.

A better understanding of the properties of the invention will be obtained from the following detailed description and accompanying drawings which set forth one or more illustrative embodiments and are indicative of the various ways in which the invention may be employed.

DETAILED DESCRIPTION OF THE DRAWINGS

Figure 1:
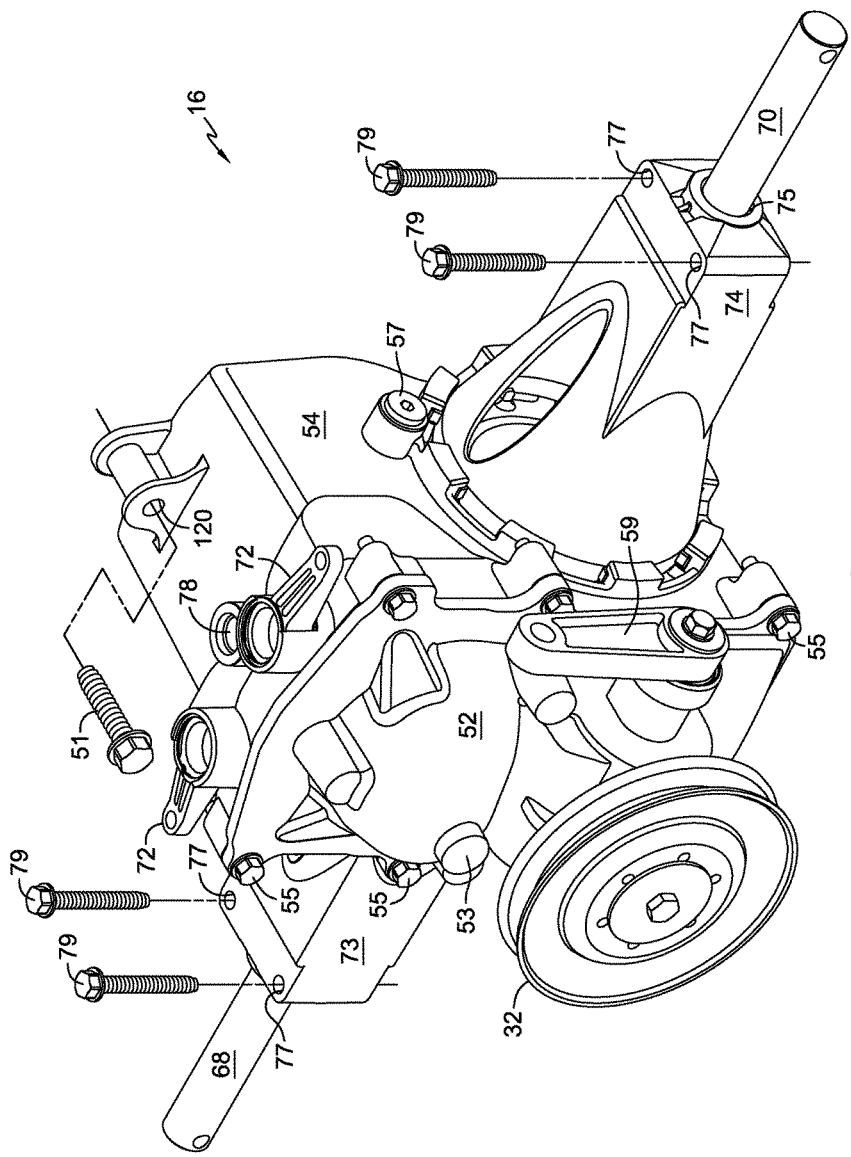
FIG. 1 is a perspective view of an exemplary hydraulic drive device.
Figure 2:
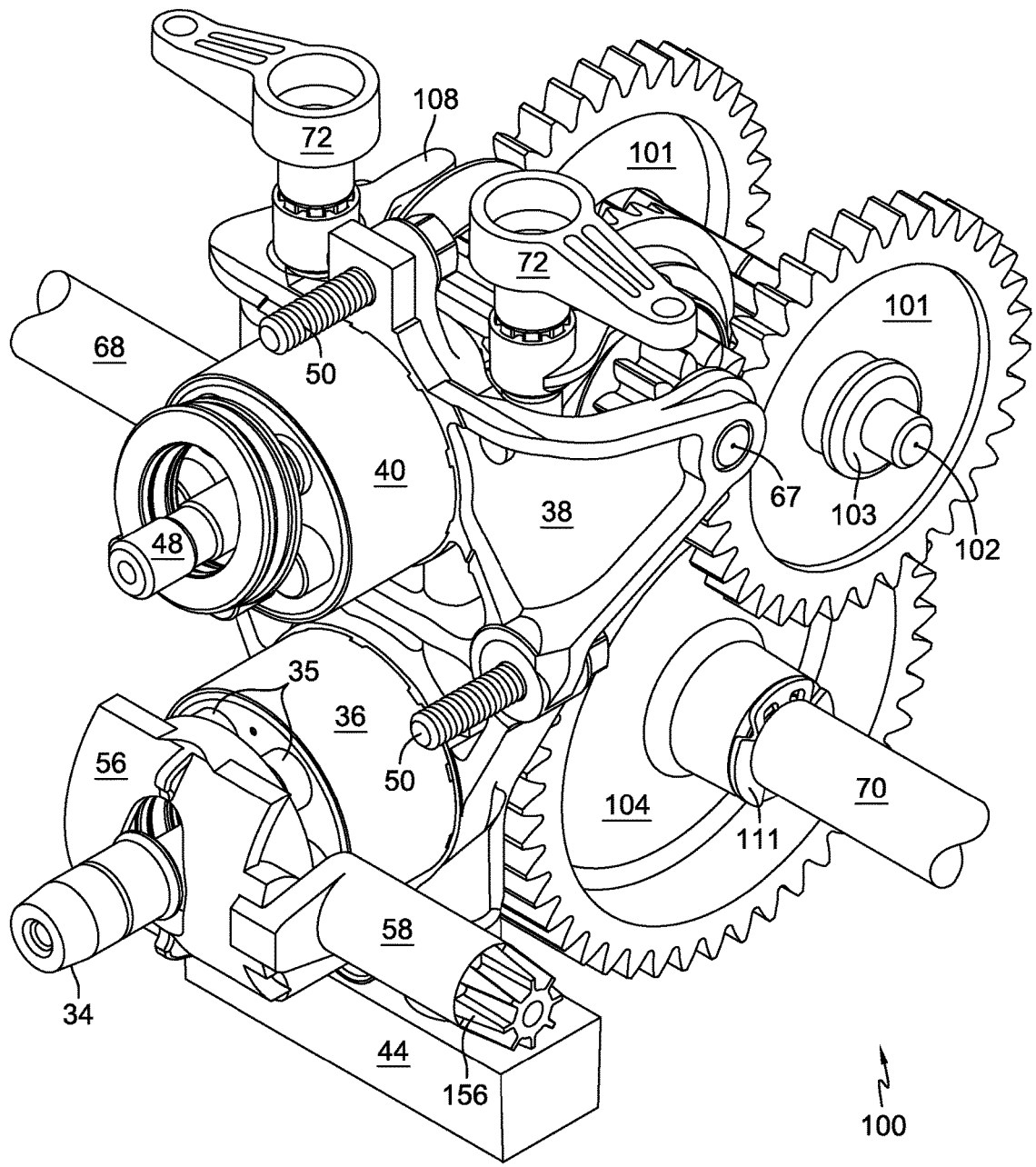
FIG. 2 is a perspective view of the hydraulic drive device shown in FIG. 1 with the housings removed.
Figure 3:
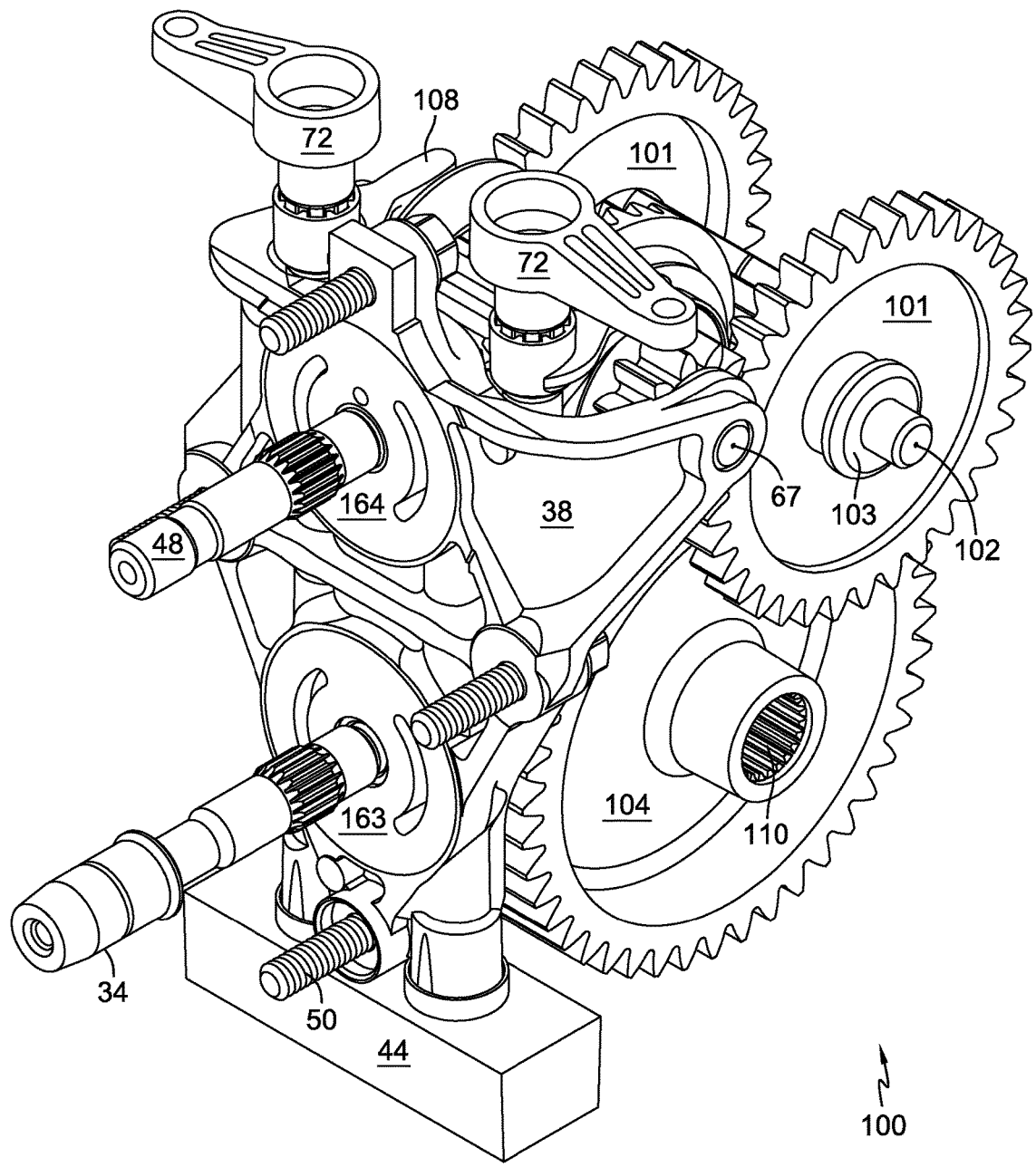
FIG. 3 is a perspective view of the portion of the hydraulic drive device shown in FIG. 1 with certain items removed for clarity.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing or serial numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

The embodiments of the drive devices disclosed herein may be used in a variety of vehicles such as a walk-behind snow thrower or other such vehicles. However, the embodiments disclosed herein are not limited to use in this type of vehicle. The transmission disclosed herein is similar in many respects to that shown in U.S. Pat. No. 8,464,610, the terms of which are incorporated herein by reference in their entirety.

Exemplary drive devices 16 and 616 are depicted in detail in FIGS. 1-8 and 9-14, respectively. Drive devices 16 and 616 are shown as a type of continuously variable hydraulic or hydrostatic transmission of a type known as an integrated hydrostatic transmission. Such transmissions are well known in the art and will only generally be described herein. Moreover, it will be appreciated by those in the art that the scope of the present invention is not limited to hydraulic transmissions, but may include any type of continuously variable transmission, all of which are referred to generically as a transmission herein. Certain aspects of drive device 16 are described in detail, with the understanding that operation of drive device 616 will be substantially the same except as noted.

Drive device 16 is powered by a prime mover (not shown) that, in the depicted embodiment, drives input shaft 34 by way of a belt and pulley system. For convenience, only pulley 32 of the belt and pulley system is shown. Input shaft 34 is engaged to and drives hydraulic pump 36, which is rotatably disposed on pump running surface 163 of center section 38. Motor 40 is rotatably disposed on motor running surface 164, formed on motor mounting portion 174. Hydraulic pump 36 is hydraulically connected to motor 40 through internal porting 165, which is formed in center section 38 and connects pump running surface 163, formed on pump mounting portion 175, with motor running surface 164.

Center section 38 may have a plurality of other components installed therein or thereon to aid in the operation of drive device 16. Other elements located on or in center section 38 may include filter 44 and fasteners 50. As seen, for example, in FIG. 3, fasteners 50 extend parallel to input shaft 34 and output shaft 48 to support center section 38 in a sump such as sump 620 formed by first housing 652 and second housing 654 in FIGS. 9 and 10.

A swash plate such as swash plate 56 is provided to control the displacement of hydraulic pump 36. Thus, as swash plate 56 is moved by trunnion arm 58, the displacement of pump pistons 35 in hydraulic pump 36 changes, causing fluid to flow through the internal porting 165 of center section 38 to motor 40, causing motor 40 to rotate. Trunnion arm 58 may be moved manually by a control arm 59 or by an electronic or hydraulic control, as is known in the art. Examples of electronic controls that could be used in connection with the present invention may be found in U.S. Pat. Nos. 7,073,330 and 8,844,658, both of which are commonly owned with this invention and incorporated herein by reference in their entireties.

Motor 40 drives output shaft 48, which has a pinion bevel gear 60 mounted thereon. Output shaft 48 passes through and is supported by opening 144 in center section 38. The end of output shaft 48 opposite pinion gear 60 is supported by housing 52 and may include a thrust washer or disc (not shown) installed in shaft support 53 of housing 52 to prevent excessive wear to housing 52. Pinion gear 60 may rotate on wear washer 65 to prevent excessive wear to center section 38.

As output shaft 48 rotates, pinion gear 60 drives clutch gear 62. Located on either side of clutch gear 62 are rings 86, which are part of clutch assembly 61, the operation of which is described in detail below. As a preliminary matter, both rings 86 are biased by springs 80 to the engaged position, and an arm 72, in conjunction with a fork 106, is positioned proximate to each ring 86, and may rotate to move rings 86 to the disengaged position, independent of one another. Each ring 86 is associated with one of shafts 68 or 70 through a separate gear train. By allowing for individual engagement and disengagement of the rings 86, individual control of shafts 68 and 70 may be provided, allowing drive device 16 to both steer and propel a vehicle comprising drive device 16.

Figure 4:
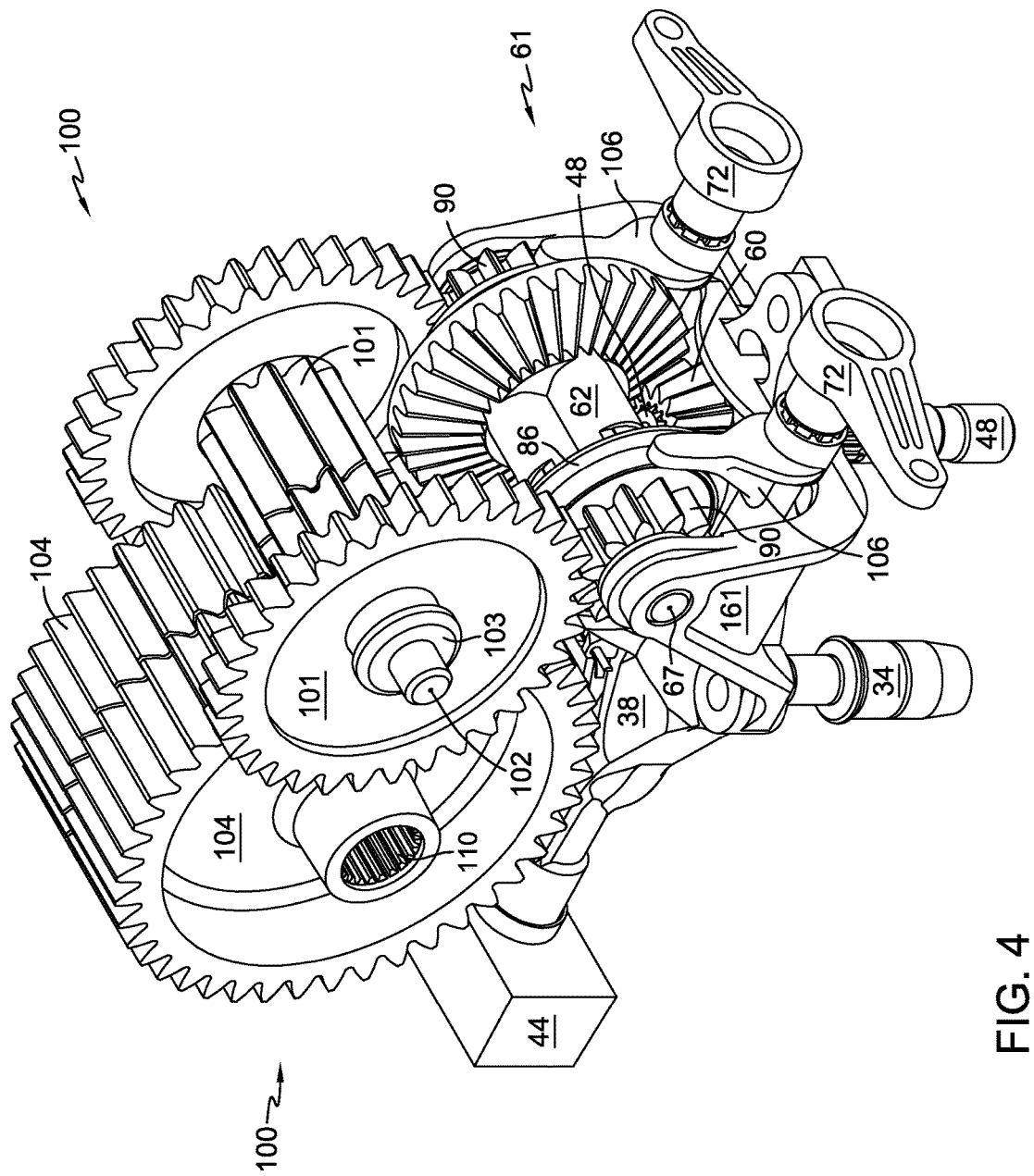
FIG. 4 is an opposite perspective view of the portion of the hydraulic drive device shown in FIG. 1 with certain items removed for clarity.
Figure 5:
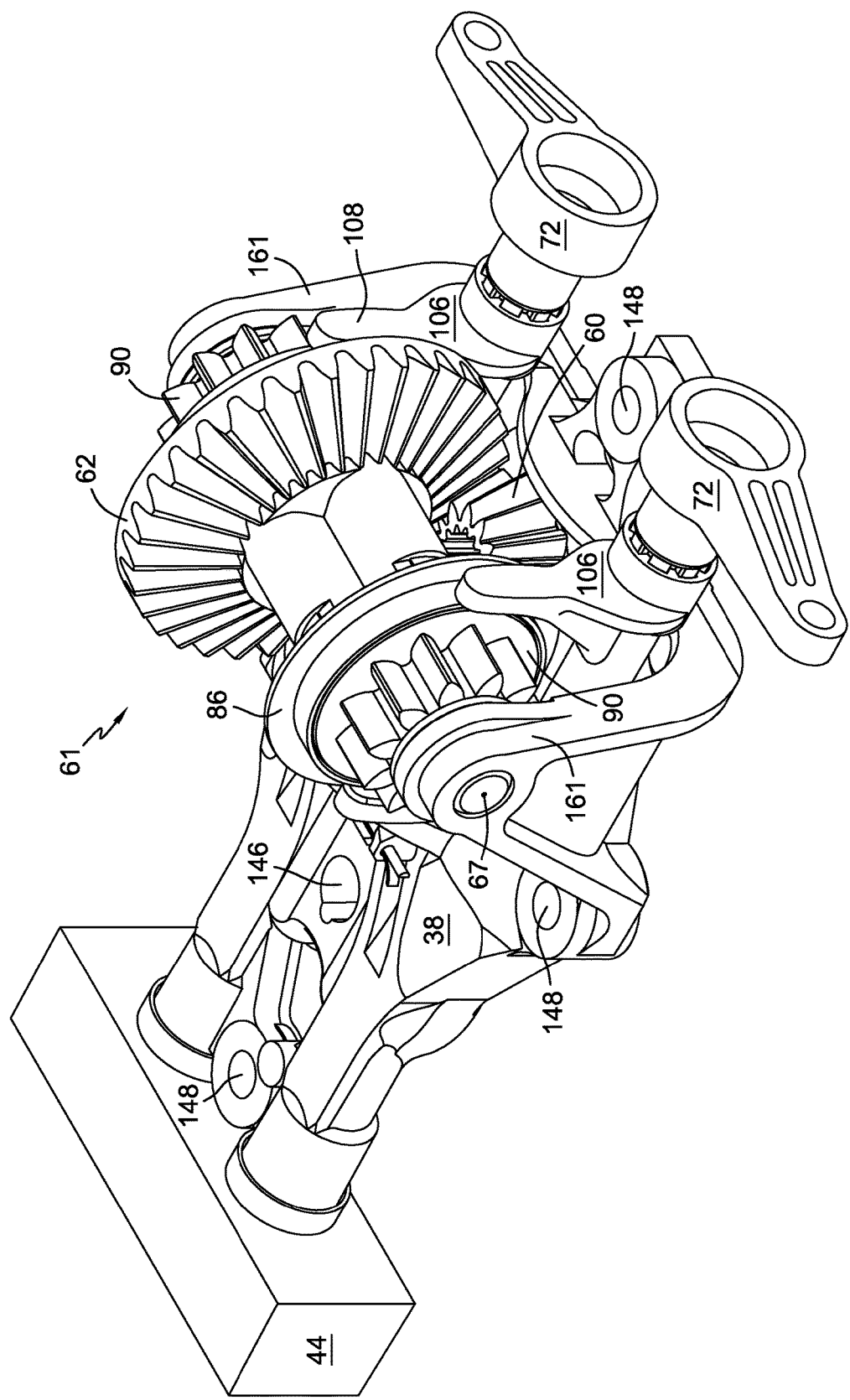
FIG. 5 is a perspective view of a portion of the hydraulic drive device shown in FIG. 4 with certain items removed for clarity.
Figure 6:
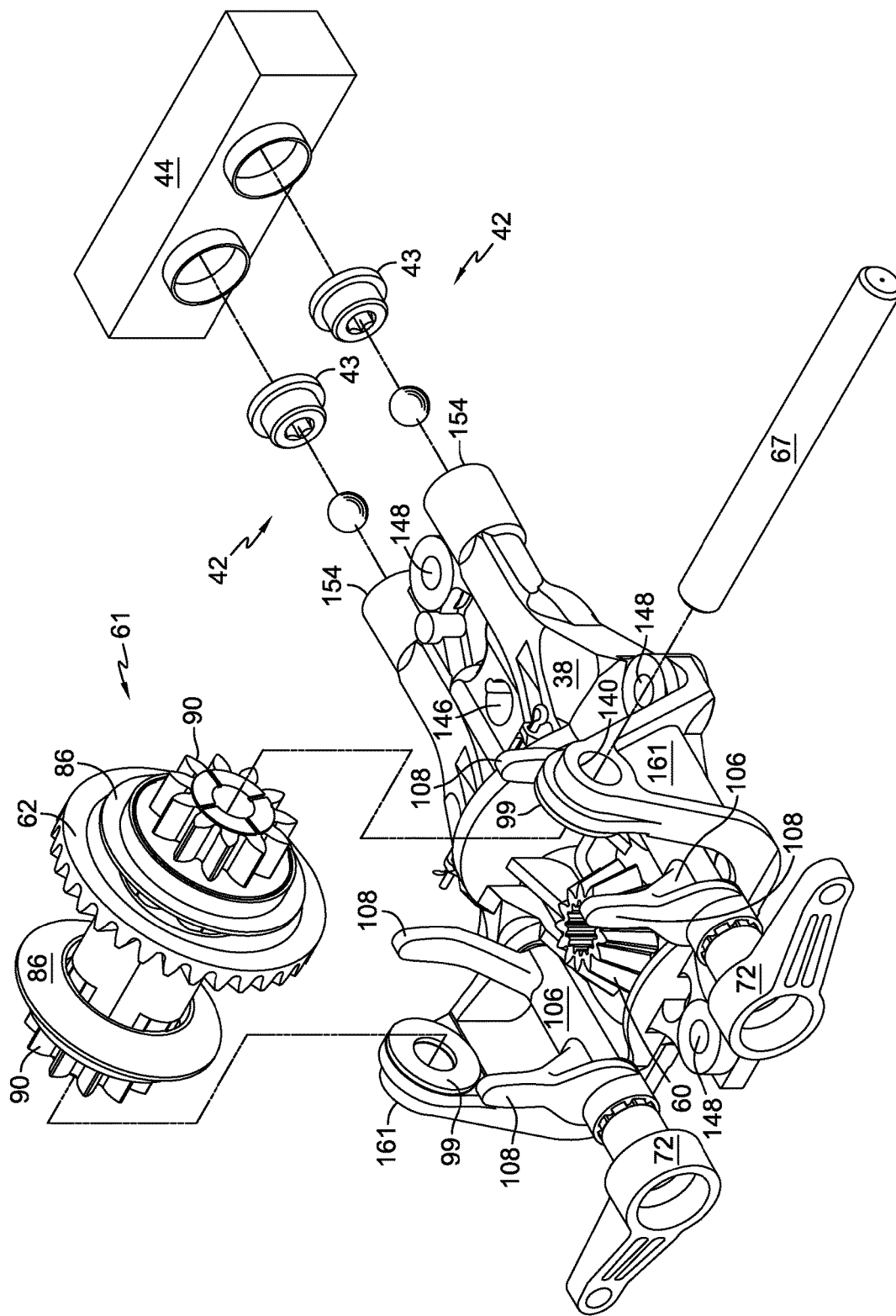
FIG. 6 is a perspective view of a portion of the hydraulic drive device shown in FIG. 1 with the assembled clutch and certain other elements shown in exploded format.
Figure 7:
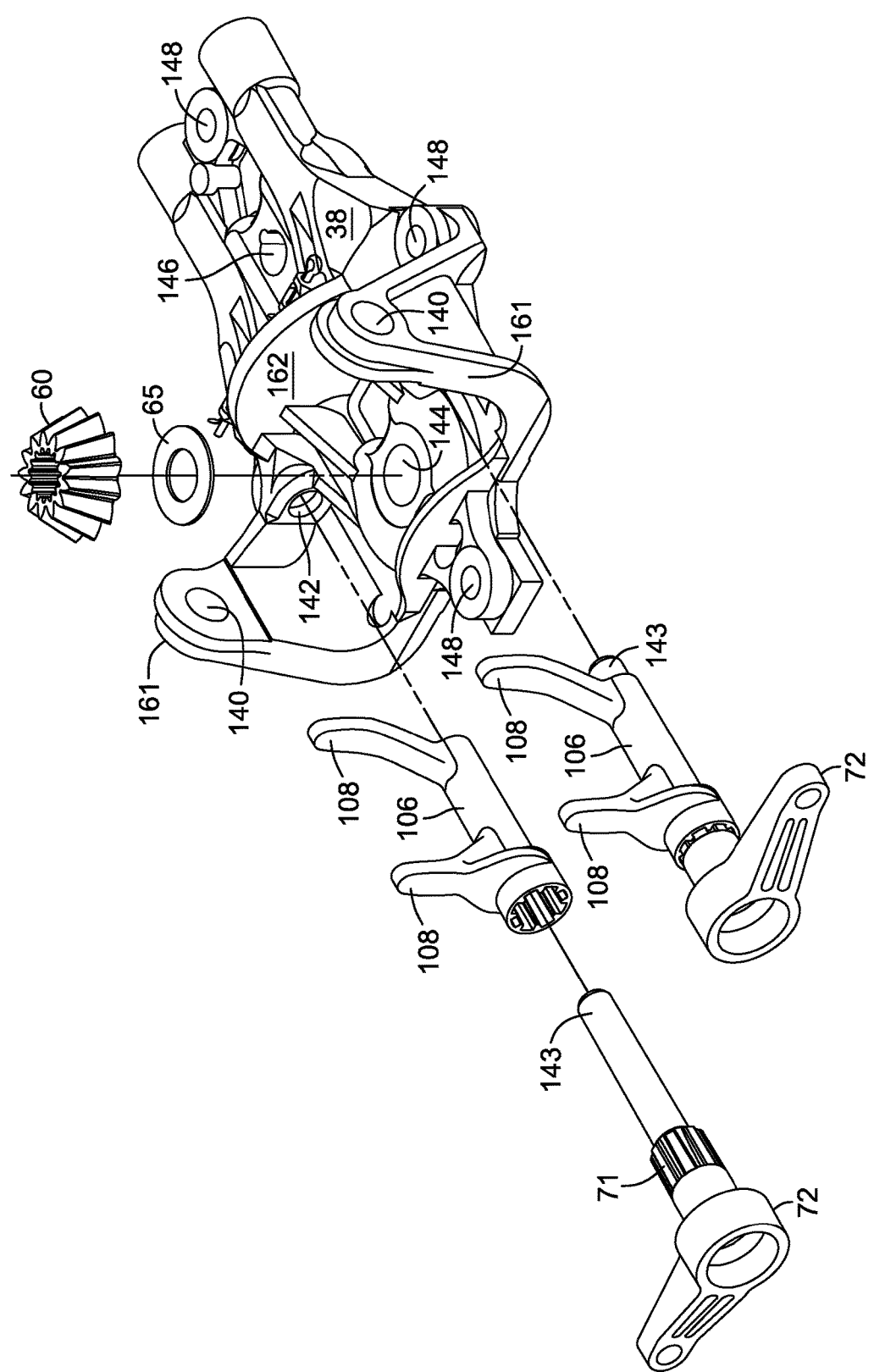
FIG. 7 is an exploded perspective view of the center section, clutch actuators, pinion gear and wear washer of the hydraulic drive device shown FIG. 1.
Figure 8:
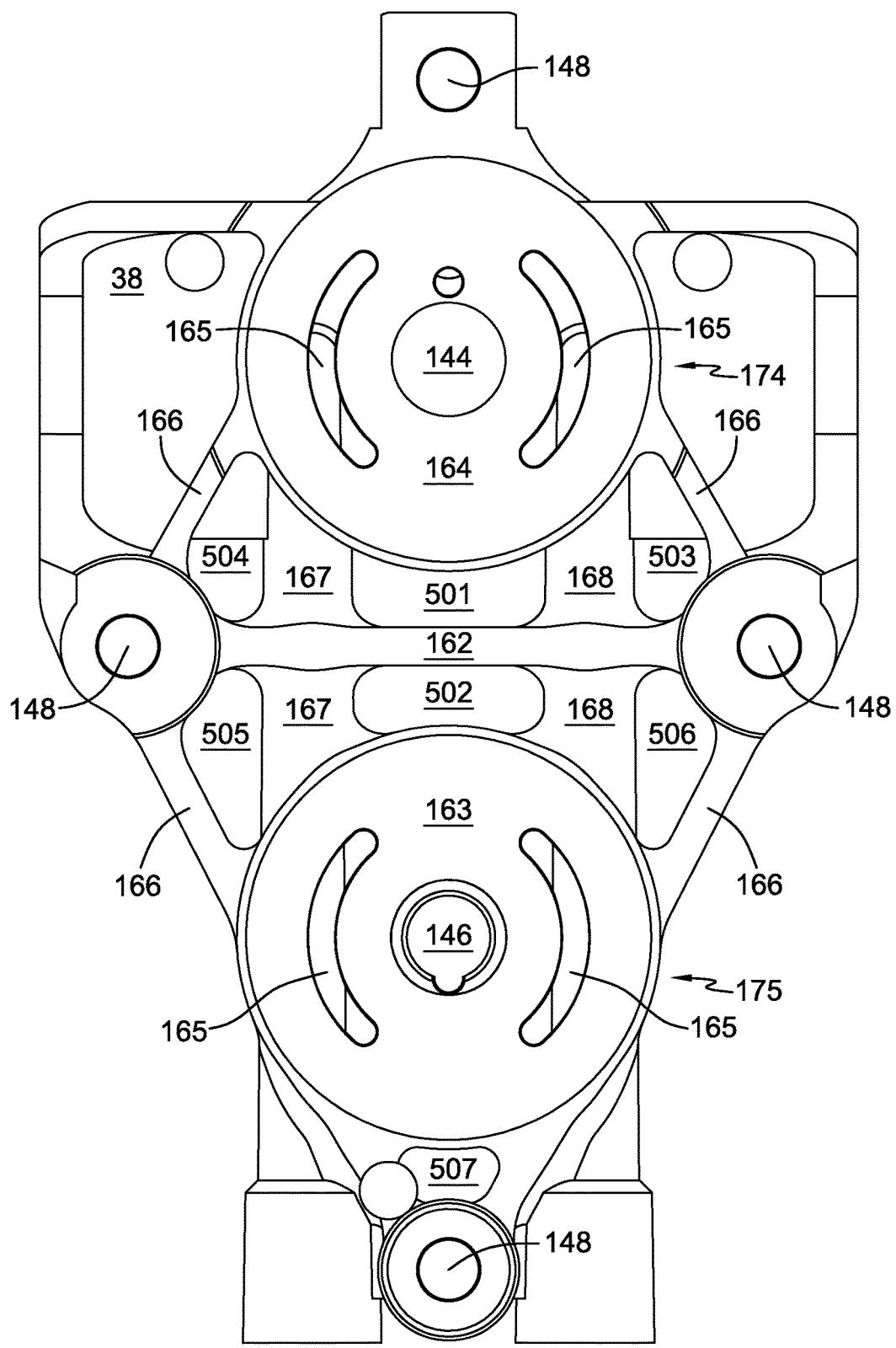
FIG. 8 is an elevational view of the center section of the hydraulic drive device shown in FIG. 1.
Figure 9:
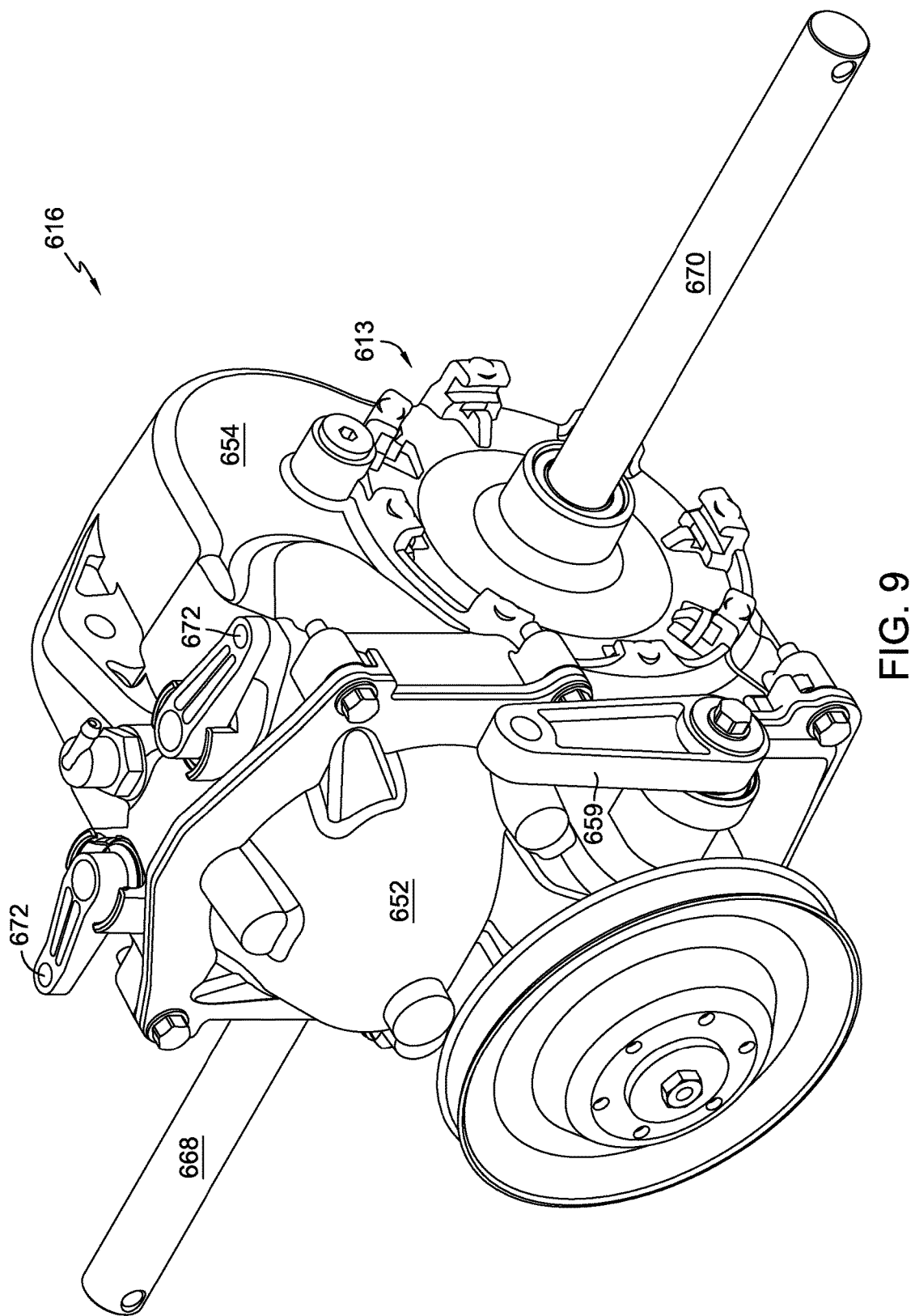
FIG. 9 is a perspective view of an exemplary drive device incorporating an embodiment of the present invention, where the axle support housings have been removed for clarity.

Steering of a vehicle is accomplished by use of clutch assembly 61, which is shown in detail in the previously incorporated U.S. Pat. No. 8,464,610. In FIGS. 4 and 5, both rings 86 of clutch assembly 61 are shown in the engaged position. In this position, clutch gear 62 provides motive power to rotate both flange gears 90. Each flange gear 90 is, in turn, engaged to a reduction gear set 100. In the depicted embodiment, each reduction gear set 100 includes a reduction spur gear 101 and a spur gear 104. Each spur gear 104 is connected to one of axle shaft 68 or 70 by splines 110.

Jackshaft 102 supports the pair of reduction spur gears 101. Cupped washers 103 are used near each end of jackshaft 102 to prevent the hubs of gears 101 from cutting into housing 54. Jackshaft 102 is retained by plugs 57 installed in each side of housing 54.

Pump input shaft 34, motor output shaft 48 and clutch actuator arms 72 are all partially supported by center section 38. Opening 146 supports one end of input shaft 34, while opening 144 supports one end of output shaft 48. Openings 142 support ends 143 of arms 72 which, in turn, support actuator forks 106. Clutch assembly 61 is entirely supported on shaft 67 which is installed through openings 140 in clutch support arms 161 of center section 38.

Figure 11:
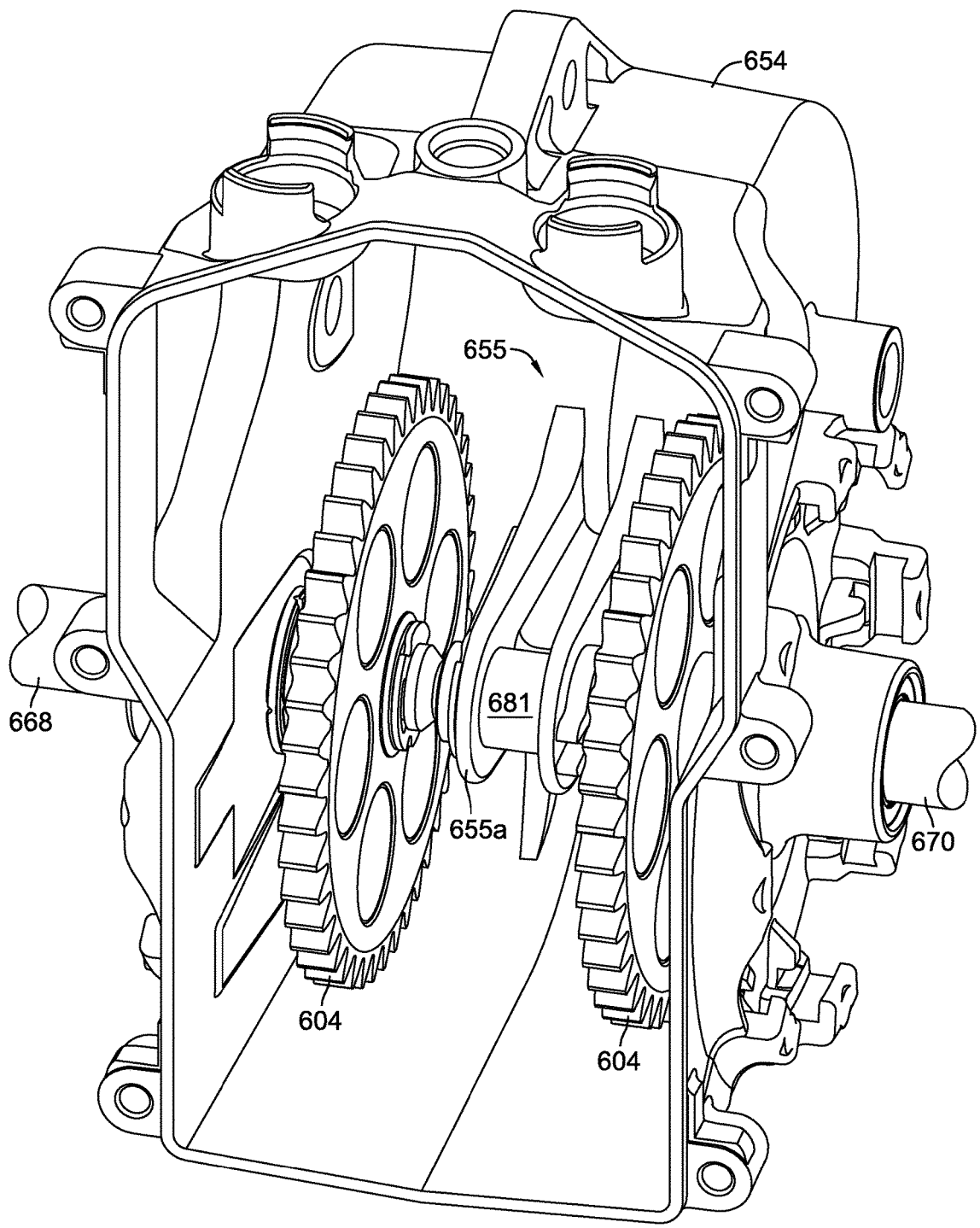
FIG. 11 is a perspective view of the drive device of FIG. 10 with additional clutch assembly and reduction gear set elements removed for clarity.
Figure 12:
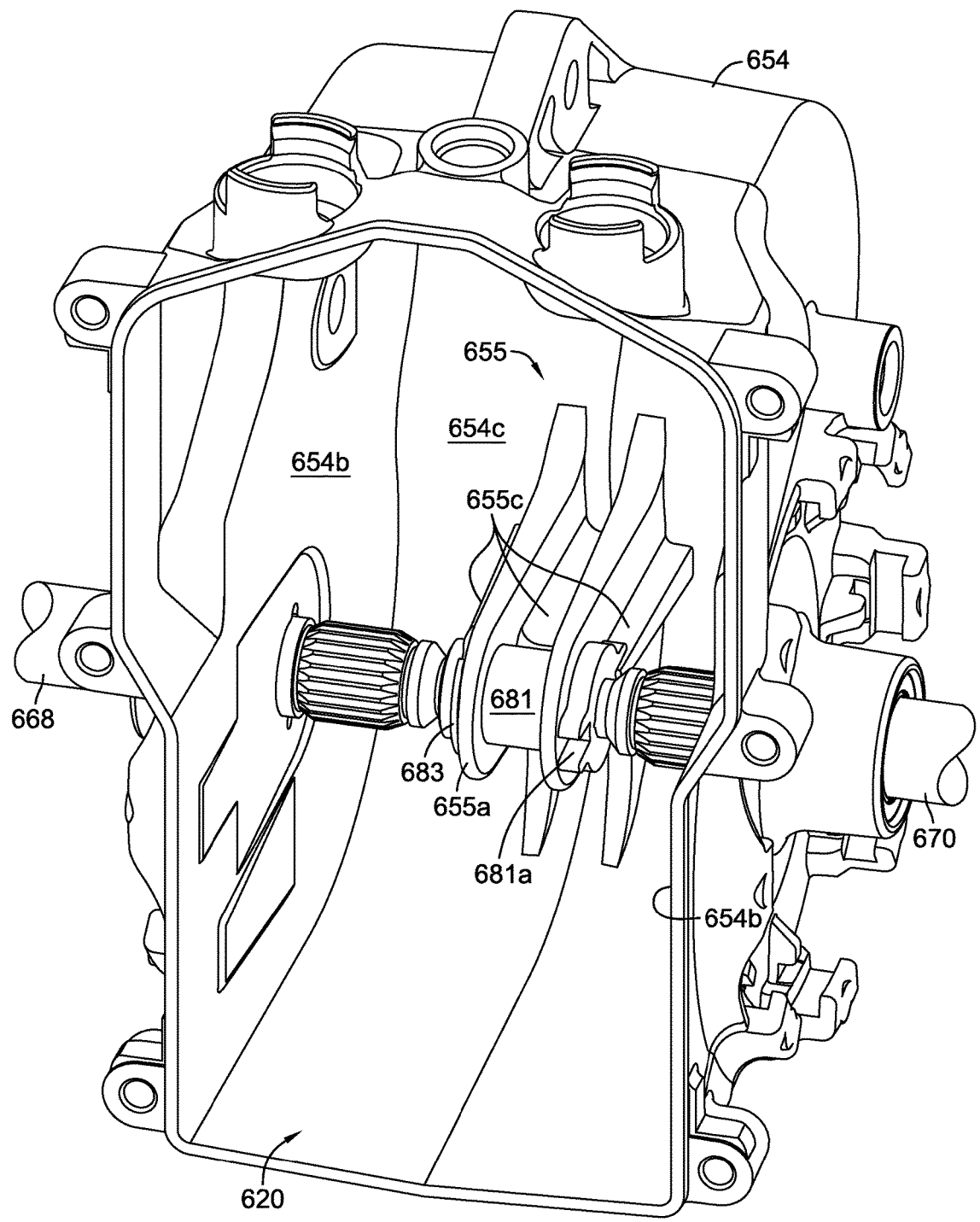
FIG. 12 is a perspective view of the drive device of FIG. 11 with the balance of the reduction gear set removed for clarity.

In order to provide a strong and rigid center section, a diamond-shaped mounting pattern is utilized in conjunction with a diamond-shaped reinforcement rib pattern. Four fasteners 50 are inserted through openings 148 to secure center section 38 to housing 52, providing a rigid subassembly of these components. A central strengthening rib 162 and four additional ribs 166 form a double triangular pattern within an overall diamond pattern. Specifically, as seen in FIG. 11, two ribs 166 extend from proximate an opening 148 to motor mounting portion 174, and two ribs 166 extend from proximate an opening 148 to pump mounting portion 175. Fluid passage structures 167 and 168, in combination with central rib 162 and buttressing ribs 176 and 178, form a sturdy H-shaped central structure to further strengthen, stiffen, and help maintain flatness of center section 38.

Easily accessible valve openings 154 are provided for installation of valves 42 in center section 38. Filter 44 is easily installed over valves 42. Central strengthening rib 162 forms one side of pockets 150 so that minimal material is used to form pockets 150. Installation of valves 170 in pockets 150 is also very simple.

A hydraulic drive device 616 having a modified housing comprising a first housing 652 and a second housing 654 is disclosed in FIGS. 9-14. As noted, hydraulic drive device 616 is substantially similar to hydraulic drive device 16, and its second housing 654 comprises many features that are substantially similar to those of housing 54. Features which are substantially similar or identical to those previously described, e.g. engagement structure 613, will not be detailed herein.

Second housing 654 includes an axle support structure 655 centrally located within second housing 654 to receive the inner journals 668*b*, 670*b* of the collinear axles 668, 670. In wheeled vehicle applications or other applications employing relatively large axle loads, the axles 668, 670 may require an additional axle support structure 655 within second housing 654 to prevent unwanted flexion and/or radial or axial movement of the axles 668, 670. Such movement can affect not only the integrity of axles 668, 670, but also the alignment of the axle-driving spur gears 604 relative to corresponding elements of reduction gear set 600, increasing wear and reducing their useful life. Thus, axle support structure 655 provides increased strength and rigidity to the drive train. It should be noted that depending upon the anticipated loading of the axles 668, 670, hydraulic drive device 616 may be used in applications with or without axle support housings (e.g. as shown without in FIG. 9). The required length of the axles 668, 670 and the presence or absence of additional bearings external to second housing 654 (e.g. a bearing associated with a vehicle frame or a pillow block bearing) will affect that determination.

As best shown in FIGS. 10-14, a sump 620 is formed by first housing 652 and second housing 654. Second housing 654 comprises two generally parallel sides or side walls 654*b* through which axles 668 and 670 extend. These side walls 654*b* are joined by a third side, or rear wall, 654*c* that is generally perpendicular thereto. Axle support structure 655 is fixedly attached to second housing 654. In the disclosed embodiment, axle support structure 655 is formed integral to second housing 654 and extends from rear wall 654*c* in a direction generally parallel to the side walls 654*b* and also generally parallel to the rotational axes of pump input shaft 634 and motor output shaft 648. The support may alternatively be formed from a separate piece of material and attached to second housing 654 with fasteners such as bolts, machine screws, rivets, or the like, or attached by means of adhesives, welding, or other joining methods known in the art.

The axle support structure 655 is depicted as having a pair of bosses 655*a* containing a plurality of collinear, bushing support apertures 655*b*. The bushing support apertures 655*b* are sized to accept one or more bushings. The bushing support apertures 655*b* may be alternatively configured as journal bearings or adapted to receive one or more bearings, such as needle or ball bearings, depending upon the desired performance and load carrying characteristics. Axle support structure 655 could likewise incorporate only a single boss similar to boss 655*a* and a single bushing support aperture.

Figure 13:
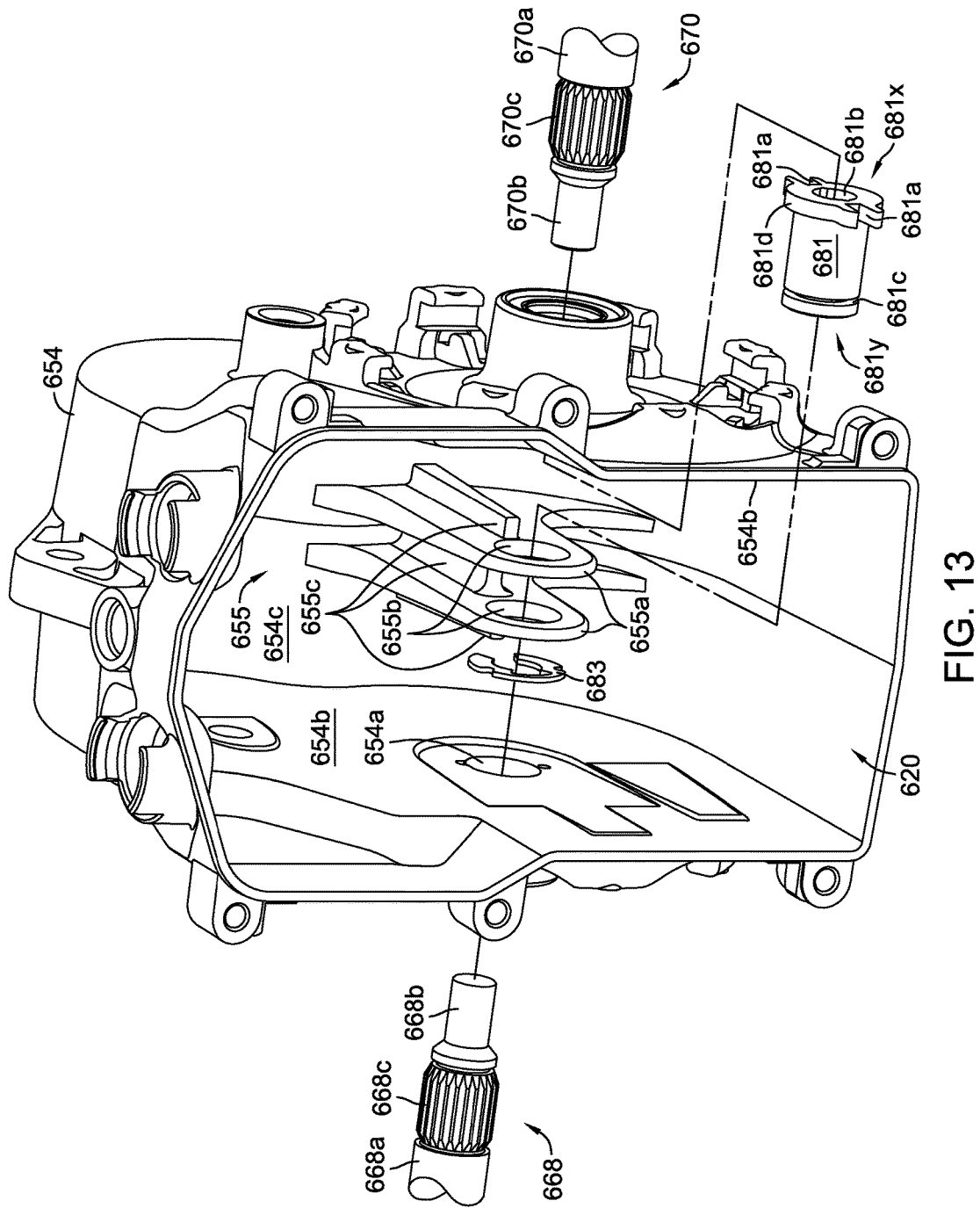
FIG. 13 is an exploded perspective view of the drive device shown in FIG. 12.

In the embodiment depicted herein, a single bushing 681 having a first end 681*x* and a second end 681*y* is inserted through the bushing support apertures 655*b*. The first end 681*x* of bushing 681 comprises a bushing flange 681*d*. The bushing flange 681*d* serves as a stop to limit the depth of insertion of bushing 681 into the bushing support apertures 655*b*. The bushing flange 681*d* further comprises a plurality of anti-rotation features or, as illustrated by way of example only, slots 681*a*. A single anti-rotation slot 681*a* engages a support rib 655*c* of the axle support structure 655 and prevents unwanted rotation of bushing 681 within the axle support structure 655. The use of the two anti-rotation slots 681*a* depicted speeds assembly. It should be noted that the anti-rotation feature, whether a slot or some other suitable shape, could be formed on the support rib 655*c* to retain a corresponding feature on the bushing flange 681*d*. After insertion and location, bushing 681 is retained in axle support structure 655 by insertion of a retaining ring 683 into an annular retaining ring groove 681*c* formed on the second end 681*y* of bushing 681. With reference to FIG. 13, bushing 681 may be inserted into axle support structure 655 from the left or right side as support rib 655*c* extends from both the left and right sides of axle support structure 655. Alternatively (not shown), the first end 681*x* and second end 681*y* of bushing 681 may have substantially similar forms, with each end formed with a retaining ring groove for retention by a retaining ring.

The bore 681*b* of bushing 681 is sized to accept the inner journals 668*b*, 670*b* of the axles 668, 670. The bushing 681, in conjunction with axle support structure 655, provides additional support for the axles and provides a suitable surface for rotation of the axles 668, 670 within second housing 654. The outer journals 668*a*, 670*a* of axles 668, 670, respectively, are rotationally supported by second housing apertures 654*a*. Alternatively (not shown), second housing apertures 654*a* can be sized to accommodate bearings, such as ball bearings, depending upon the desired performance and load carrying characteristics. Axles 668, 670, via splines 668*c*, 670*c*, engage the corresponding splines 610 of final spur gears 604, and are thus driven by reduction gear set 600.

Figure 10:
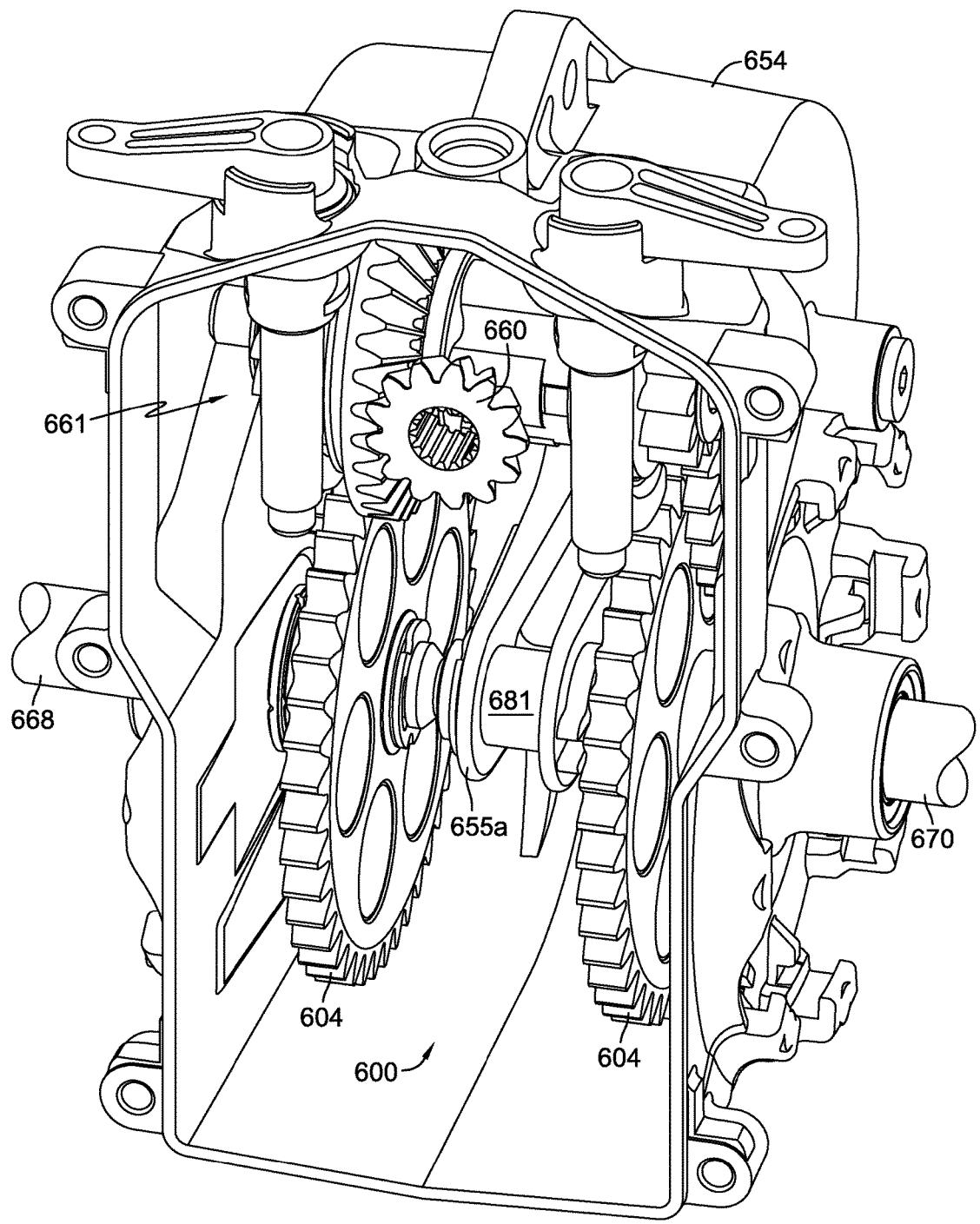
FIG. 10 is a perspective view of the drive device of FIG. 9 with its pulley, a housing element, and drive components removed for clarity.
Figure 14:
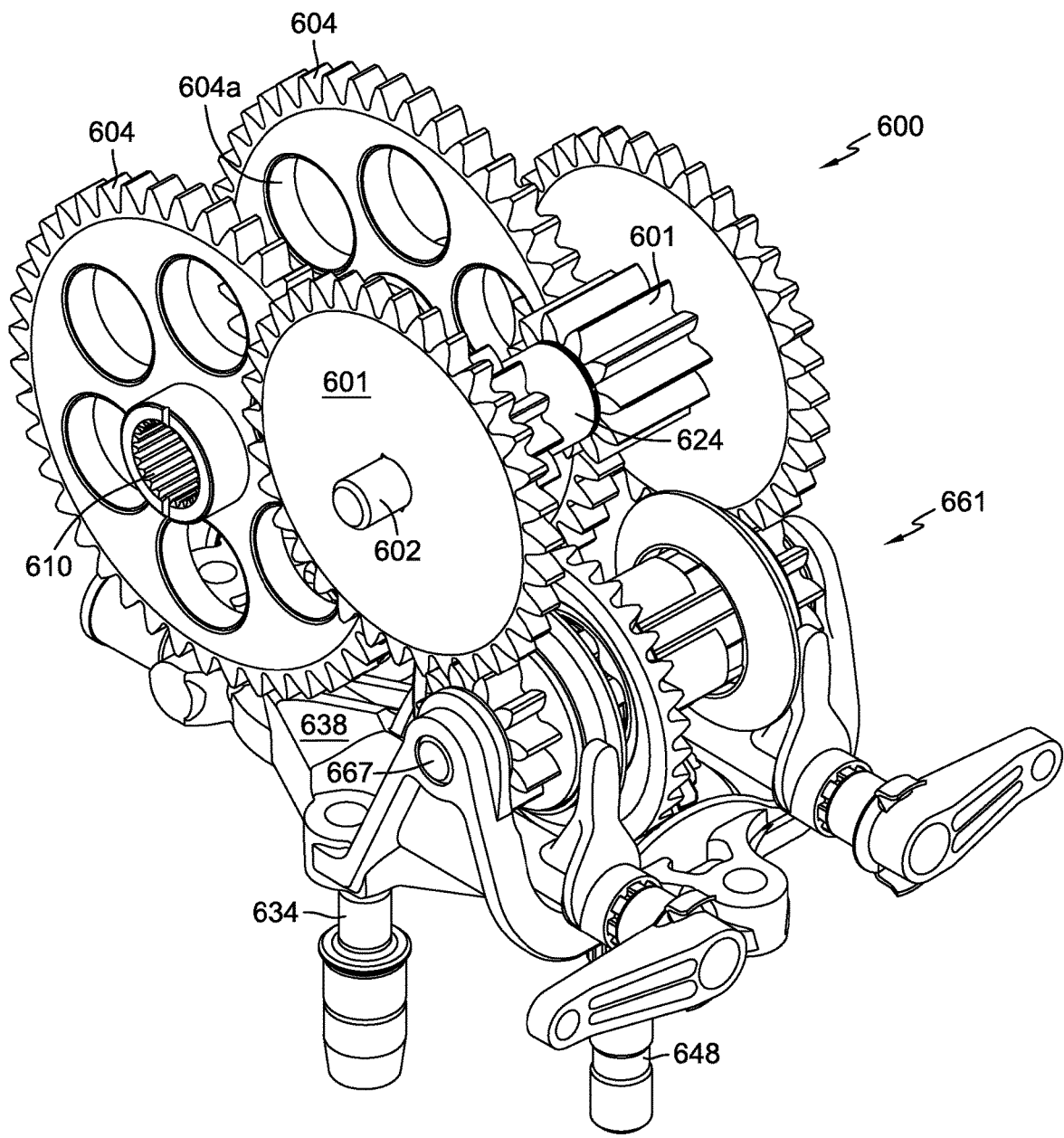
FIG. 14 is a rotated perspective view of the reduction gear set, clutch assembly and center section of the drive device of FIG. 13.

As compared to the reduction gear set 100 of hydraulic drive device 16, reduction gear set 600 has been modified to accommodate axle support structure 655. As shown in FIGS. 10 and 14, the final spur gears 604 have been spaced apart and reduced in width to eliminate interference with axle support structure 655. In addition, lightening features 604*a* have been added to the final spur gears 604 to reduce material use. Other modifications to reduction gear set 600 include the addition of a spacer 624 on jackshaft 602 to separate the reduction spur gears or combination gears 601, whose width is also reduced. The function of both the dual clutch assembly 661 and reduction gear set 600 is substantially identical to that of dual clutch assembly 61 and reduction gear set 100 and will not further be described herein. As with the prior embodiments, clutch support shaft 667 is supported on center section 638, and jackshaft 602 is supported by second housing 654. Center section 638 is similar in many respects to center section 38, with minor modifications not material to the present invention.

Figure 15:
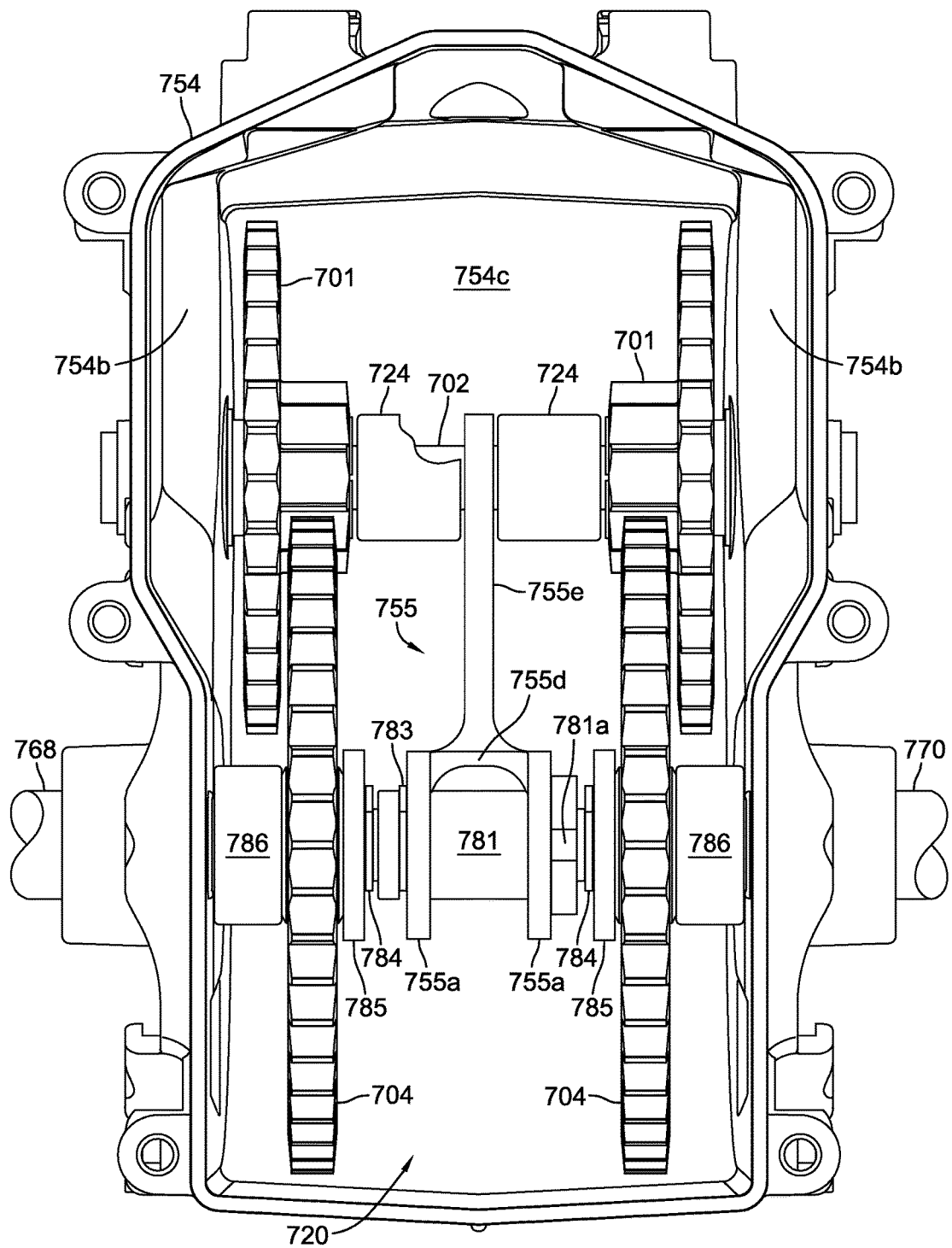
FIG. 15 is an elevational view of an alternative embodiment of a housing incorporating an additional shaft support means.
Figure 16:
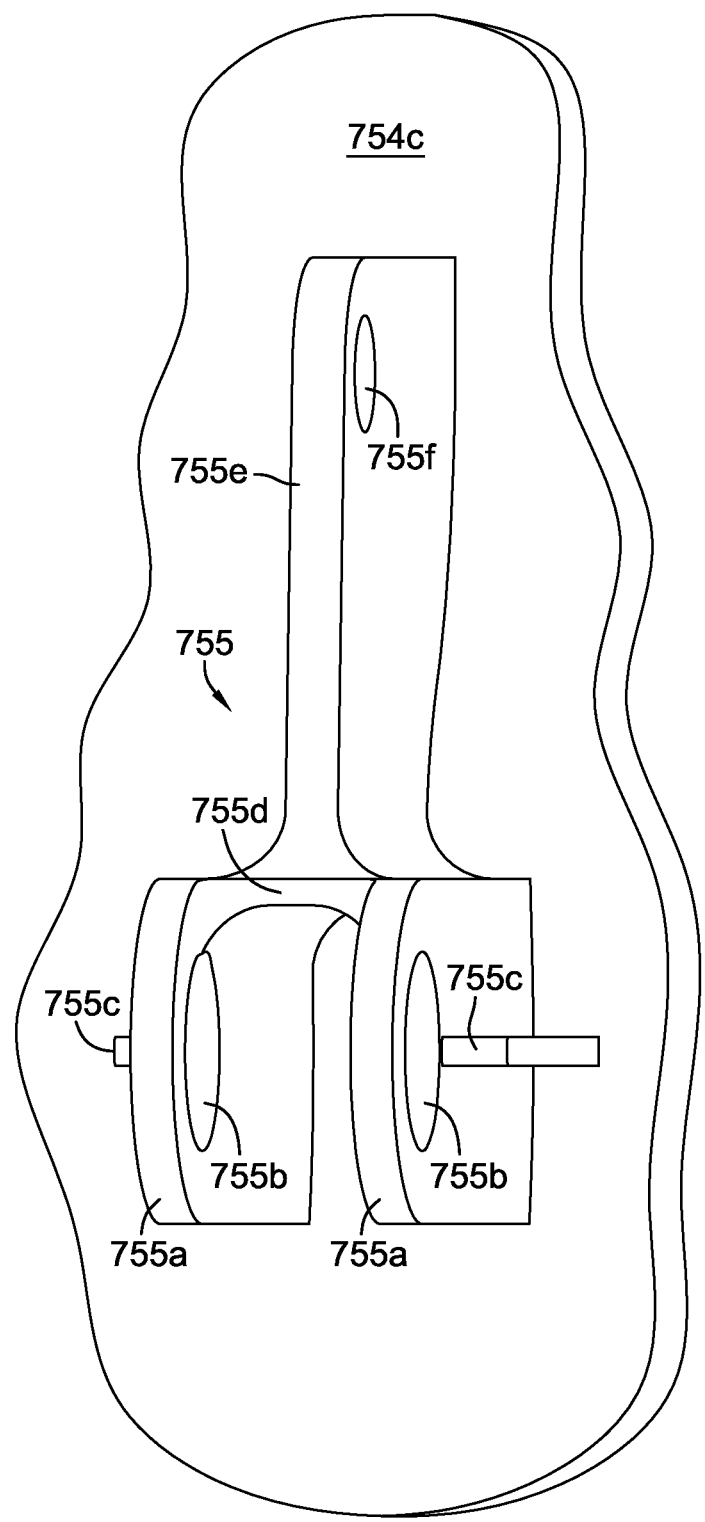
FIG. 16 is a perspective view of a segment of an internal housing wall and shaft support means of the embodiment of FIG. 15.

In a further embodiment, as depicted in FIGS. 15 and 16, an additional support structure is disclosed for supporting the jackshaft 702 used to support reduction spur gears 701, in addition to supporting the axle shafts 768 and 770 as in prior embodiments. Reduction spur gears 701 are combination gears engaged to final spur gears 704 to drive axles 768 and 770. As shown most clearly in FIG. 16, internal wall 754*c* of second housing 754 has a unitary support structure 755 formed thereon.

Unitary support structure 755 has two lobes 755*a*, each having an aperture 755*b* to provide support for bushing 781, and lobes 755*a* are connected by a bridge structure 755*d*. A pair of structural support ribs 755*c* is also extended outwardly from each lobe 755*a*. Bushing 781 is similar to previously described bushing 681 and comprises anti-rotation slots 781*a* that are similar to anti-rotation slots 681*a*. A retaining ring 783 secures bushing 781 in position to ensure proper engagement of an anti-rotation slot 781*a* with a rib 755*c*. To provide proper spacing of the gears, a pair of gear spacers 786 is provided. A spacer 786 is disposed between each spur gear 704 and its respective side wall 754*b*. A pair of washers 785 and retaining rings 784 are also used to provide wear surfaces and properly locate spur gears 704. Retaining rings 784 engage axles 768 and 770 to secure them in second housing 754.

Jackshaft support rib 755*e* extends from bridge 755*d* and has aperture 755*f* formed therein to support jackshaft 702. A pair of spacers 724 is disposed one on either side of support rib 755*e*. Each spacer 724 is disposed between the support rib 755*e* and one of the combination reduction spur gears 701. It will be noted that the use of the two spacers 724 may accommodate the use of narrower reduction spur gears 701 than in the prior embodiment. Thus, a simple means for supporting the jackshaft 702 is provided. While the two support structures disclosed herein are depicted as a unitary structure, it will be understood that these two supports could also be separate structures, and support structure 755 or the separate structures could also be fastened to the wall as discussed above, as opposed to being integrally formed therewith. It should also be understood that jackshaft 702 may be allowed to rotate and that aperture 755*f* can be adapted to further support a bushing, a journal bearing or other type of bearing, such as a needle bearing or a ball bearing, to support a rotating jackshaft 702, depending upon desired performance and load carrying characteristics.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus for a vehicle, the drive apparatus comprising:
   a housing having a first side and a second side opposite the first side, and a third side separate from the first side and the second side, wherein the first side, second side and third side define a chamber;
   a first axle extending into the chamber from the first side and having a first proximal end disposed in the chamber and a first distal end disposed external to the chamber;
   a second axle extending into the chamber from the second side, wherein the first axle and the second axle are collinearly disposed, the second axle having a second proximal end disposed in the chamber and a second distal end disposed external to the chamber;
   a transmission comprising a first driven gear engaged to the first axle adjacent the first proximal end and a second driven gear engaged to the second axle adjacent the second proximal end, wherein the transmission is capable of independently driving the first axle and the second axle; and
   an axle support structure disposed in the chamber and extending from the third side between the first driven gear and the second driven gear to receive the first proximal end of the first axle and the second proximal end of the second axle.

2. The drive apparatus of claim 1, wherein the axle support structure is integrally formed on the third side of the housing.

3. The drive apparatus of claim 1, further comprising a bushing disposed in the axle support structure to receive the first proximal end of the first axle and the second proximal end of the second axle.

4. The drive apparatus of claim 3, wherein the axle support structure comprises at least one aperture to receive the bushing.

5. The drive apparatus of claim 4, wherein the bushing comprises a flange at a first end of the bushing and an annular groove at a second end of the bushing.

6. The drive apparatus of claim 5, wherein the bushing is retained in the at least one aperture by a retaining ring disposed in the annular groove.

7. The drive apparatus of claim 5, wherein the flange comprises at least one anti-rotation feature, and the axle support structure further comprises a corresponding feature to engage the at least one anti-rotation feature of the flange.

8. The drive apparatus of claim 7, wherein the at least one anti-rotation feature of the flange is a slot and the corresponding feature of the axle support structure is a support rib.

9. The drive apparatus of claim 5, wherein the flange abuts a first face of the at least one aperture.

10. The drive apparatus of claim 1, wherein the transmission comprises:
    a hydraulic pump disposed on a center section having porting formed therein;
    a hydraulic motor disposed on the center section and driven by hydraulic communication with the hydraulic pump through the porting;
    a reduction gear set driven by the hydraulic motor; and
    a clutch assembly supported by the center section that permits the reduction gear set to independently drive the first axle and the second axle.

11. The drive apparatus of claim 1, further comprising:
    a reduction gear set driven by the transmission and disposed between the transmission and the first and second driven gears, the reduction gear set comprising a plurality of gears;
    a jackshaft, wherein at least one of the plurality of gears in the reduction gear set is supported by the jackshaft; and
    a jackshaft support structure disposed in the chamber and extending from the third side to receive and support the jackshaft.

12. The drive apparatus of claim 11, wherein the jackshaft support structure is integrally formed as part of the axle support structure.

13. A drive apparatus for a vehicle having a pair of driven axles disposed on a common axis of rotation, the drive apparatus comprising:
    a housing;
    a center section disposed in the housing;
    a hydraulic pump disposed on the center section and driven by an input shaft extending into the housing;
    a hydraulic motor disposed on the center section and driving an output shaft, wherein the hydraulic motor is driven by the hydraulic pump via hydraulic communication through the center section;
    a reduction gear set disposed in the housing and powered by the output shaft, the reduction gear set comprising a first driven gear engaged to one of the pair of driven axles and a second driven gear engaged to a second of the pair of driven axles;
    a clutch assembly disposed in the housing between the output shaft and the reduction gear set, wherein the clutch assembly permits the reduction gear set to transfer power from the output shaft to independently power each of the pair of driven axles; and
    an axle support structure extending from an internal wall of the housing and supporting a first end of each of the pair of driven axles.

14. The drive apparatus of claim 13, wherein the center section comprises:
    a hydraulic pump mounting portion having a pump running surface;
    a hydraulic motor mounting portion having a motor running surface oriented generally coplanar with the pump running surface;
    porting in communication with the pump running surface and the motor running surface; and
    a plurality of ribs engaged to the hydraulic pump mounting portion, the hydraulic motor mounting portion, and the porting.

15. The drive apparatus of claim 13, further comprising a bushing disposed in the axle support structure.

16. The drive apparatus of claim 15, wherein the axle support structure is integrally formed with the housing.

17. The drive apparatus of claim 15, wherein the axle support structure comprises a pair of apertures to receive the bushing.

18. The drive apparatus of claim 17, wherein the bushing comprises a bushing flange at a first end of the bushing and an annular groove at a second end of the bushing, and the bushing is retained in the pair of apertures by a retaining ring disposed about the annular groove.

19. The drive apparatus of claim 18, wherein the bushing flange comprises at least one anti-rotation feature, and the axle support structure further comprises a corresponding feature to engage the at least one anti-rotation feature of the bushing flange.

20. The drive apparatus of claim 19, wherein the at least one anti-rotation feature of the bushing flange is a slot and the corresponding feature of the axle support structure is a support rib.

21. The drive apparatus of claim 18, wherein the bushing flange abuts a first face of one of the pair of apertures.

22. The drive apparatus of claim 15, wherein the axle support structure comprises a pair of bosses extending from the internal wall of the housing, each boss having a separate aperture formed therein to receive the bushing.

23. The drive apparatus of claim 13, wherein the hydraulic pump and the hydraulic motor are disposed on one side of the center section and the clutch assembly is disposed on an opposite side of the center section.

24. A drive apparatus for a vehicle having a pair of driven axles disposed on a common axis of rotation, the drive apparatus comprising:
a housing;
a hydraulic pump disposed on a first side of a center section located in the housing, wherein the hydraulic pump is driven by an input shaft extending into the housing, the input shaft having a first axis of rotation;
a hydraulic motor disposed on the first side of the center section and having an output shaft for transmitting output torque to the pair of driven axles, the output shaft passing through to a second side of the center section opposite the first side, wherein the hydraulic motor is driven by the hydraulic pump via hydraulic communication through the center section and the output shaft has a second axis of rotation;
an axle support structure extending from an internal wall of the housing in a direction parallel to the first axis of rotation; and
a bushing disposed in the axle support structure, the bushing supporting a first end of each of the pair of driven axles.

25. The drive apparatus of claim 24, wherein the second axis of rotation is parallel to the first axis of rotation.

26. The drive apparatus of claim 24, further comprising a plurality of reduction gears disposed between the output shaft and the pair of driven axles, a jackshaft, wherein at least one of the plurality of reduction gears is supported by the jackshaft, and a jackshaft support structure extending from the internal wall of the housing to receive and support the jackshaft.

27. The drive apparatus of claim 26, wherein the jackshaft support structure is integrally formed as part of the axle support structure.

* * * * *